2 Sheets—Sheet 1.

C. H. MAYO.
Band Sawing-Machine.

No. 213,222. Patented Mar. 11, 1879.

WITNESSES:
C. Clarence Poole
Warren Suly

INVENTOR:
Charles H. Mayo
by Geo W Dyer & Co
attys

2 Sheets—Sheet 2

C. H. MAYO.
Band Sawing-Machine.

No. 213,222.   Patented Mar. 11, 1879.

WITNESSES:
Clarence Poole
Warren Seely

INVENTOR:
Charles H. Mayo
by Geo. W. Dyer
Atty

UNITED STATES PATENT OFFICE.

CHARLES H. MAYO, OF DEFIANCE, OHIO.

IMPROVEMENT IN BAND SAWING-MACHINES.

Specification forming part of Letters Patent No. 213,222, dated March 11, 1879; application filed January 24, 1879.

*To all whom it may concern:*

Be it known that I, CHARLES H. MAYO, of Defiance, in the county of Defiance and State of Ohio, have invented a new and useful Improvement in Band Sawing-Machines; and I do declare that the following is a true and accurate description thereof, reference being had to the accompanying drawings, and to the letters of reference marked thereon, forming a part of this specification.

The nature of this invention relates to new and useful improvements in that class of machines known as "band sawing-machines;" and consists, first, in the mechanism for adjusting the saw-table; second, in an improvement in the device or dog by means of which the log is held in place while being sawed; and, third, in the adjustability of the device carrying the brush, by means of which the saw is kept free from dust, as more fully hereinafter set forth.

Figure 1:
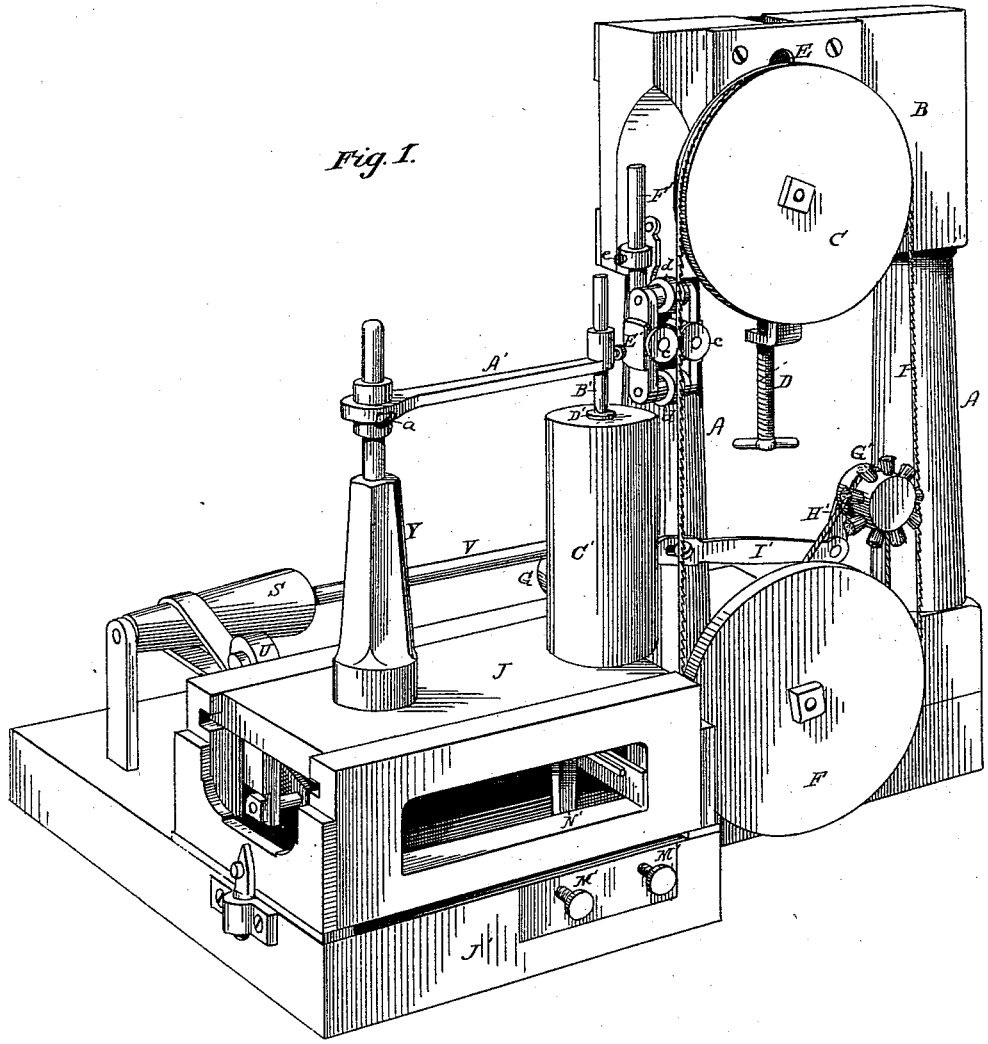
Figure 4:
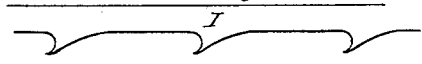
Figure 5:
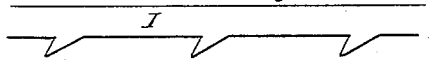
Figure 2:
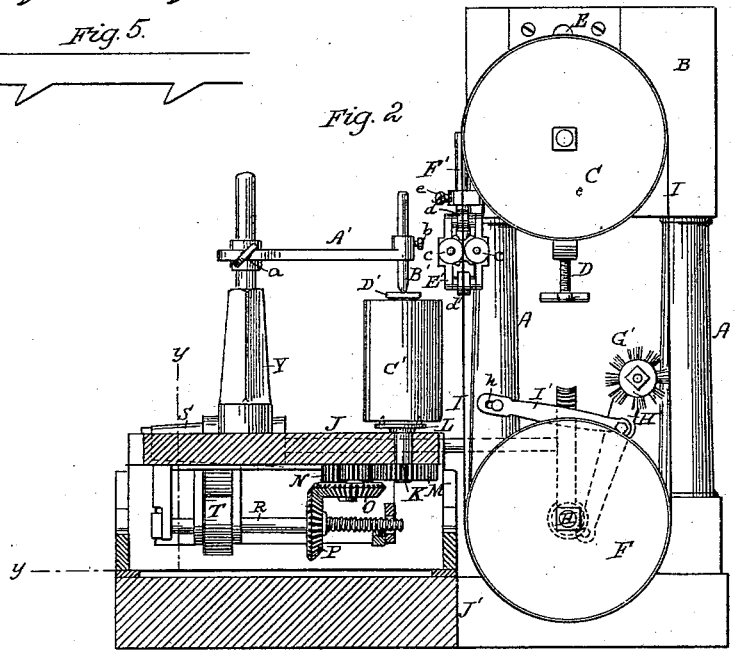
Figure 3:
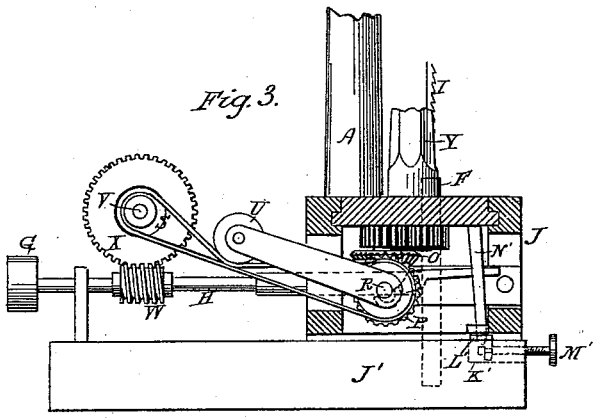
Figure 6:
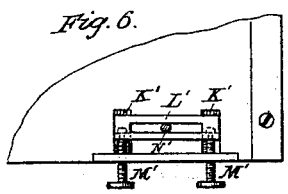

Figure 1 is a perspective view of my improved band sawing-machine. Fig. 2 is a side elevation, partly in section, at $x$ $x$ in Fig. 1. Fig. 3 is a sectional end elevation on line $y$ $y$, Fig. 2. Fig. 4 is an elevation or plan view of a section of my improved band-saw. Fig. 5 is a similar view of a section of a band-saw as formerly constructed and used. Fig. 6 is a top view of a portion of the bed-piece with the carriage removed to show the devices for adjusting the slotted block.

In the drawings, A represents two vertical posts, provided with a cap, B, to which the wheel C is journaled in a bearing susceptible of a vertical adjustment by means of the screw D and slot E, within which the journal-box of the wheel-shaft has a vertical movement. The wheel F is journaled to the shaft H, between the lower ends of the posts A, and motion is communicated thereto by means of the pulley G and any suitable belt from any convenient power.

The saw is an endless or band saw, so called, and is represented at I in the annexed drawings, and is supported and driven by the two wheels C F, which are placed, as shown, one immediately above the other, the disposition of the saw being such that its broadest area is presented to the periphery of the log, and about at right angles to the axis of the carriage J. This saw has been heretofore made as is shown in Fig. 5, its teeth projecting at an acute angle from its face, which almost invariably caused the saw to crack at the base of the tooth, the crack commencing at the sharp angle formed at said base.

My improvement in the construction of the band-saw is shown in Fig. 4, where the teeth are made at their base and point of conjunction with the band of the saw in curved lines or cycloidal in form, as shown, presenting no acute angles, and thereby obviating the difficulties and dangers heretofore attending the use of band-saws.

Through the carriage J projects a short shaft, K, upon the top of which is placed a circular dog, L. This shaft K, below the floor of the carriage, is provided with a gear-wheel, M, which engages with the pinion N, which is secured to the upper side of the bevel-pinion O, which engages with the bevel-gear P, secured to the shaft R, to which motion is given by a belt from the pulley S to the pulley T. U is a tightener-pulley and arm designed to keep a proper tension on the belt. The pulley S, secured to the counter-shaft V, receives motion from the main driving-shaft H by means of the worm W on said shaft and the worm-wheel X on said counter-shaft. Rising from the carriage J is the post Y, upon which is sleeved the arm A', adjustable vertically by means of the set-screw $a$. The outer end of this arm is provided with a vertical point, D', passing through the end of said arm, and vertically adjustable by means of the set-screw $b$. When the log or bolt C' is set vertically, and centered upon the dog L, the arm A' is adjusted as the height of the log may require. A loose dog, D', is centered upon the top end of the log, and the point B' is forced down upon said dog, which holds the log firmly in place, and it is rotated by the mechanism hereinbefore described when the machine is in operation. The saw I travels between two guide-pulleys, $c$, journaled to the face of the frame E' to keep it straight as it enters the log, and in the top and bottom of this frame are transversely journaled the rollers $d$, against which the back of the saw runs to prevent it from jumping, breaking, and wearing unequally. This frame E' is secured to a rod, F', which, in turn, is adjustably secured to one of the posts A, as shown, by means of the set-screw e, and near the upper wheel or pulley, C.

In order to remove from the saw, when cutting the log, the attenuated strip or shaving of wood, which would otherwise return to the log and adhere to and clog the movement of the saw, and render the machine inoperative, I mount a cylindrical brush, G', upon an axis at the outer end of an arm, H', the lower end of which is pivoted to the bed-frame in the rear of the lower wheel, F. As the position of the brush must be changed as the bristles wear off by contact with the saw, I attach to the arm H' an arm, I', adjustably secured to the inner post, A, by means of a set-screw and slot h, as shown. The situation and position of this brush must be such that it will revolve in the same general direction as that traveled by the saw in order to effect the desired result. The bed-plate J', upon which the carriage J rests, is recessed, as shown at K', to receive a slotted block, L', which is adjustable horizontally by means of the set-screws M' projecting through the plate, covering the front of the recess, as shown in Fig. 1. A pivotal pin, N', secured to the under side of the carriage, engages with the slot in block L', and by means of the set-screws M' the operator is enabled to vary the relative position of the log in relation to the saw and its own center of support, so that the cut of the saw may be had upon the log in the rear of its periphery.

What I claim as my invention is—

1. In a band sawing-machine carriage, and in combination therewith, the pivotal pin N', engaging with the slotted block L' in the recess K' of the bed J', and adjustable by means of the set-screws M', for the purposes specified.

2. In combination with the carriage of a band sawing-machine, and with the dog L, the arm A', adjustable by means of the set-screw a upon the post Y, the point B', vertically adjustable in the arm A' by means of the set-screw b, and the upper centering dog, D', as and for the purposes described.

3. In a band sawing-machine, the combination of the cylindrical brush G' with the arm H' and the adjustable arm I', for the purposes set forth.

CHARLES H. MAYO.

Witnesses:
 H. S. SPRAGUE,
 R. A. SPRAGUE.